(12) United States Patent
Jørgensen

(10) Patent No.: US 6,513,278 B1
(45) Date of Patent: Feb. 4, 2003

(54) SNOOD FOR A LONG LINE

(75) Inventor: Torben Jørgensen, Værløse (DK)

(73) Assignee: Svendsen & Heinsbaek A/S, Vaerlose (DK)

( * ) Notice: Subject to any disclaimer, the term of this patent is extended or adjusted under 35 U.S.C. 154(b) by 0 days.

(21) Appl. No.: 09/926,166

(22) PCT Filed: Mar. 17, 2000

(86) PCT No.: PCT/DK00/00122
§ 371 (c)(1), (2), (4) Date: Sep. 17, 2001

(87) PCT Pub. No.: WO00/54582
PCT Pub. Date: Sep. 21, 2000

(30) Foreign Application Priority Data

Mar. 17, 1999 (DK) .......... 1999 00372

(51) Int. Cl.⁷ .............................. A01K 79/00
(52) U.S. Cl. ..................... 43/44.84; 43/44.85
(58) Field of Search ............... 43/44.84, 44.85, 43/42.74, 57.3, 27.4

(56) References Cited

U.S. PATENT DOCUMENTS

| | | | |
|---|---|---|---|
| 3,533,184 A | | 10/1970 | Kerr |
| 4,136,146 A | * | 1/1979 | Ninneman ............ 264/237 |
| 4,194,273 A | * | 3/1980 | Williams ............ 43/42.74 |
| 4,357,775 A | * | 11/1982 | Click ............ 43/42.74 |
| 4,836,767 A | * | 6/1989 | Schad et al. ............ 264/237 |
| 4,836,960 A | * | 6/1989 | Spector et al. ............ 264/2.2 |
| 4,945,671 A | | 8/1990 | Jonsson |
| 4,961,888 A | * | 10/1990 | Brown ............ 264/40.6 |
| 5,286,186 A | * | 2/1994 | Brown et al. ............ 264/40.6 |
| 5,577,339 A | * | 11/1996 | Haigh ............ 43/42.74 |
| 5,666,759 A | * | 9/1997 | Thormodsen et al. ...... 43/44.84 |
| 5,926,996 A | * | 7/1999 | Frazier ............ 43/44.84 |
| 6,129,883 A | * | 10/2000 | Jacovich et al. ......... 264/297.3 |
| 6,348,169 B1 | * | 2/2002 | Stipes et al. ............ 264/255 |

FOREIGN PATENT DOCUMENTS

| | | | | |
|---|---|---|---|---|
| DK | 108703 | * | 1/1968 | ............ 43/44.84 |
| DK | 165099 | | 10/1992 | |

* cited by examiner

Primary Examiner—Peter M. Poon
Assistant Examiner—Joan M. Olszewski
(74) Attorney, Agent, or Firm—Oblon, Spivak, McClelland, Maier & Neustadt, P.C.

(57) ABSTRACT

A snood for a long line including a fastening device for securing the snood to the long line. The snood further includes a snood line provided with a hook at one end. The opposite end of the snood line extends through an aperture formed in the fastening device. The aperture ends in a chamber formed in the fastening device, the chamber being adapted to rotatably receive a thickening provided at the extremity of the second end of the snood line and being integrally formed therewith by injection molding. The snood line is made of a plastic material being different from and having another melting point than that of the plastic material from which the fastening device is made.

9 Claims, 5 Drawing Sheets

SNOOD FOR A LONG LINE

TECHNICAL FIELD

The invention relates to a snood for a long line, said snood comprising an injection molded plastic fastening device for securing the snood between fixed stop means and being shaped substantially as an open annular or tubular member with two arms, locking means being provided at the free ends thereof and adapted to lockingly snap engage each other so as to form a gripping aperture receiving the long line and to allow the fastening device to rotate freely about the long line, said snood further comprising a snood line provided with a first thickening at one end, the shank tip of a hook being fixedly embedded therein and the other end of the line extending through an aperture formed in the fastening device and having an axis substantially in a plane essentially perpendicular to the long line when the fastening device is mounted thereon, said aperture ending in a seat in a chamber formed in the fastening device, said chamber adapted to rotatably receive a second thickening arranged at the extremity of the second end of the snood line.

BACKGROUND ART

U.S. Pat. No. 3,533,184 discloses a snood with a clip comprising two arms which are adapted to lockingly snap engage each other so as to form a gripping aperture receiving the long line. The clip is further provided with a through-going hole extending transversely of the long line in the mounted state of the clip. One end of the snood line is passed through the said hole and secured to the clip by means of a knot.

Furthermore DK-B165099 discloses a snood of the above type, wherein the second thickening, which is accommodated in the chamber of the fastening device, is formed of a knob. It is not stated in the publication how the said knob is connected to the snood line, but it appears from the drawing that it is made as a separate part secured to the end of the snood line. When manufacturing the snood the other end of the snood line is passed through the hole in the fastening device from the outside, whereafter the separately manufactured knob is secured to the outer end of the snood line eg by being glued or clamped thereon.

BRIEF DESCRIPTION OF THE INVENTION

The snood line according to the present invention is characterized in that the second thickening is formed integrally with the snood line by injection molding thereof in a plastic material different from and having a melting point different from the plastic material from which the fastening device is injection molded, the snood being formed in two successive molding processes of the snood line and the fastening device, respectively, the second thickening accommodated in the chamber and the snood line extending through aperture.

The number of separate elements forming the snood and the number of operations necessary for manufacturing the snood are thus reduced at the same time as the risk is minimised of the second thickening being torn off the snood line and the latter thereby being separated from the fastening device.

According to the invention the second thickening of the snood line may be rotational-symmetrical about the axis of the snood line.

Furthermore according to the invention the second thickening of the snood line may be substantially spherical at least in the portion facing the seat of the fastening device. As a result the snood line may rotate freely in every direction, which is advantageous when handling the long line and the snoods arranged thereon.

Moreover according to the invention the chamber at least in the seat area may have a substantially cylindrical inner shape and extends between opposed lateral walls of the fastening device transversely of the aperture.

The invention also relates to a method of manufacturing a snood according to the invention, and by which method the snood line with associated first and second thickenings is molded in a corresponding mold cavity of an injection mold, the outer shank tip of the hook being embedded in a first thickening at the same time and the fastening device subsequently being molded in a corresponding second mold of an injection mold, the thickening portion of the snood line being accommodate in a portion of the mold cavity corresponding to the chamber and the portion of the snood line adjacent the second thickening forming a part of the mold cavity, and whereby the material of the snood line has a melting point exceeding the melting point of the material of the fastening device.

According to the method the snood line may be molded in a first injection mold and subsequently thereto be transferred to a second injection mold, in which the fastening device is molded, the second thickening of the snood line accommodated in the chamber and the line extending through the aperture. However it is also possible to mold the fastening device in the same mold as the one in which the snood line is molded, the mold thus being provided with movable mold parts which subsequent to the molding of the snood line may be moved to positions for the formation of a mold cavity for molding the fastening device. Injection molds formed in this manner are known to persons skilled in the art.

It should further be mentioned that at the molding of the fastening device the end portions of the snood line comprising the second thickening may also be molded such that the thickening forms the mold cavity for the chamber in a manner corresponding to the manner in which the adjacent portion of the snood line forms the aperture of the mold cavity portion.

However, according to a preferred embodiment of the method the mold cavity for injection molding the fastening device comprises mold-cavity forming parts enclosing the second thickening and forming a chamber whose inner surface is spaced apart from and encloses the thickening. A clearance is thereby obtained between the thickening and the inner surface of the chamber to allow free movement of the thickening and thus of the snood line relative to the fastening device.

The invention relates to another method of manufacturing a snood according to the invention, by which method the fastening device and the aperture therein are molded in a corresponding mold cavity of an injection mold, the snood line subsequently being molded in a corresponding second mold cavity of an injection mold and the fastening device being arranged such in the mold that the portions of the mold cavity corresponding to the thickening are arranged in the chamber and at least the aperture of the fastening device forms part of the mold cavity, and whereby the material of the fastening device has a melting point exceeding the melting point of the material of the snood line.

In this second method according to the invention the fastening device may be molded in a first mold and subsequently transferred to a second mold, in which the molding of the snood line and embedment of the hook take place as described above in connection with the first method according to the invention. It is, however, also possible to mold the fastening device and the snood line in one and the same mold by providing the mold with movable mold parts which can be moved to form the mold cavities necessary for the two molding processes.

Moreover according to the invention the mold cavity for injection molding the snood line may comprise molding-cavity forming parts for the formation of a second thickening accommodated in the chamber spaced apart from the inner surface thereof. As a result the thickening has a high degree of movability in the chamber, whereby the snood line has high movability in relation to the fastening device. It is preferred in both said methods according to the invention that the snood line is of a stretchable plastic material and that the snood line is stretched subsequent to the molding of the snood. By stretching the snood line, preferably at an increased temperature below its melting point, said line becomes thinner, whereby a clearance between the line and the aperture is created. As a result the free movability of the snood line is increased in relation to the fastening device. Stretching the snood line also increases the strength of the line.

It is preferred in both said methods according to the invention that the snood line is of a stretchable plastic material and that the snood line is stretched subsequent to the moulding of the snood. By stretching the snood line, preferably at an increased temperature below its melting point, said line becomes thinner, whereby a clearance between the line and the aperture is created. As a result the free movability of the snood line is increased in relation to the fastening device. Stretching the snood line also increases the strength of the line.

A great number of different materials may be used for the snood fastening device and the snood line and the choice is obvious to a person skilled in the art. An example of a possible material combination for use in a method by which initially the snood line is molded and subsequently the fastening device is molded is a snood line made of polyamide, e.g. at least partially crystalline polyamide such as PA6, and polyoxy methylene (POM) for the fastening device. An example of a possible material combination for use in a method by which initially the fastening device line is molded and subsequently the snood line is molded is a fastening device made of polyamide imide (PAI) and a snood line of polyamide as mentioned above.

BRIEF DESCRIPTION OF THE DRAWINGS

The invention is explained in detail below with reference to the drawings, in which.

BEST MODE FOR CARRYING OUT THE INVENTION

Figure 1:
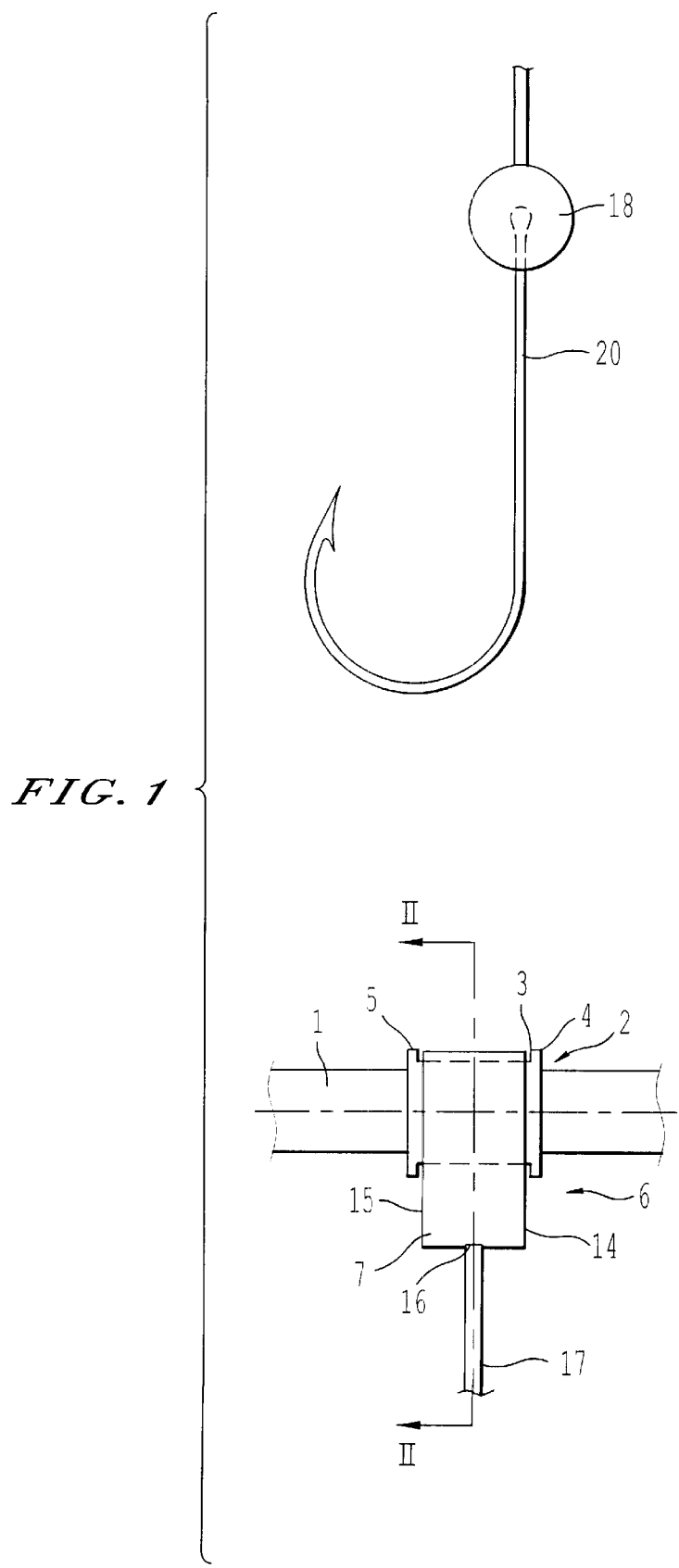
FIG. 1 is a diagrammatic side view of a portion of a long line and a snood according to the invention mounted thereon.
Figure 2:
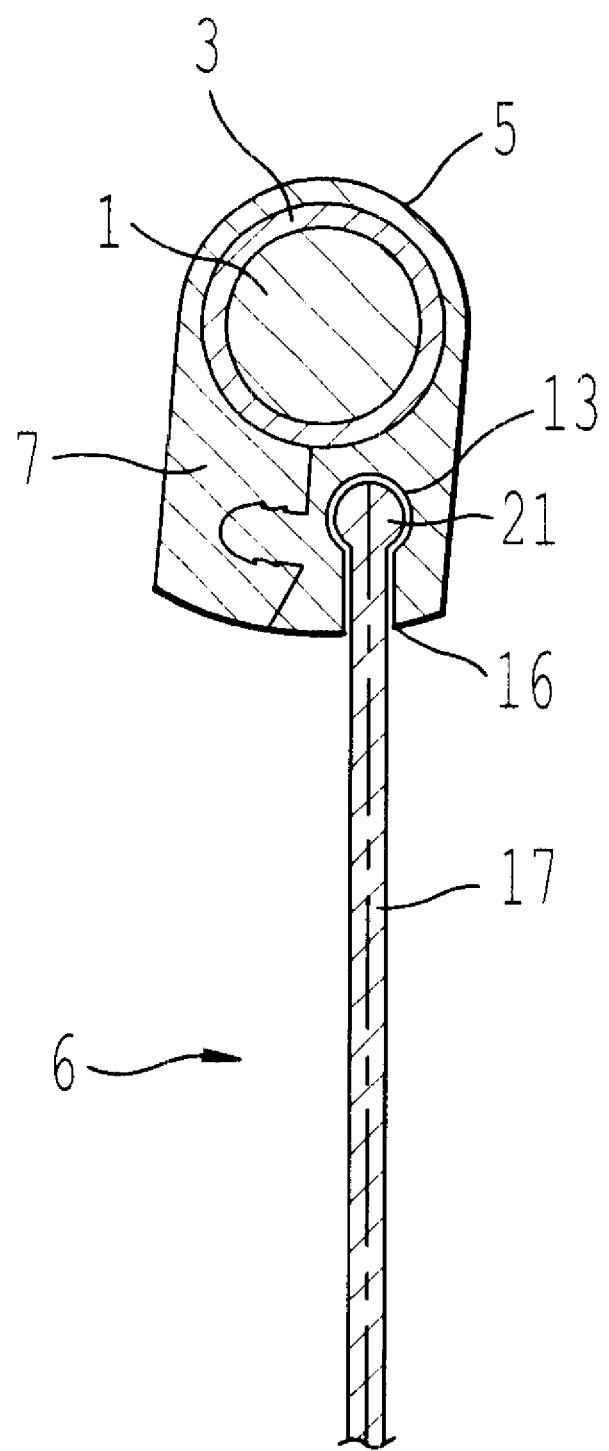
FIG. 2 is a sectional view along the line II—II in FIG. 1.

FIGS. 1 and 2 illustrate a portion of a long line 1, to which a cylindrical sleeve 2 is secured having a cylindrical body 3 and radially outwardly extending flanges 4,5 at each end of the body 3. It should be understood that the long line 1 is provided with a plurality of mutually interspaced sleeves 2. A snood 6 according to the invention rotatable about the longitudinal axis of the snood line 17 is mounted on the sleeve 2 by means of a fastening device 7 forming part of the snood 6.

Figure 3:
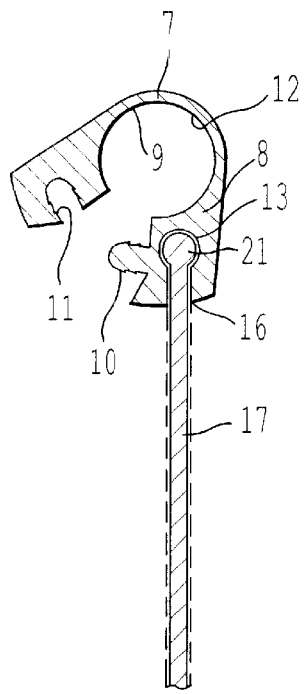
FIG. 3 is a sectional view corresponding to the section II—II in Fig. through a snood according to the invention in its non-mounted state.
Figure 3:
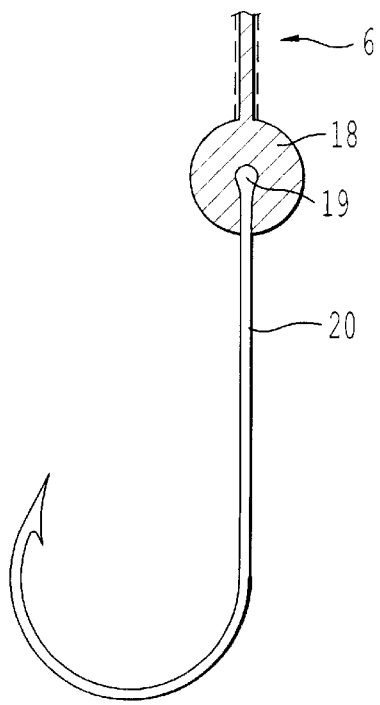

As illustrated in FIG. 3 the fastening device 7 of the snood 6 is shaped as an open annular or tubular member with two arms 8,9. At their free ends the arms are provided with locking means 10,11 which are adapted to lockingly engage each other by a snap action. The locking means 10 on the free end of the arm 8 is formed as a rib with barbs, while the locking means 11 on the outer end of the arm 9 is formed as a corresponding groove with barbs. For mounting the fastening device 7 on the sleeve 2, the arms 8,9 are inserted over the body 3 of the sleeve 2 and subsequently pressed towards each other to bring the locking means 10, 11 into locking snap-engagement with each other. The inner surfaces 12 of the arms thereby form a cylindrical gripping aperture having a diameter slightly larger than the diameter of the sleeve body 3 and receiving the latter, as shown in FIG. 2. In the arm 8 of the fastening device 7 a cylindrical chamber 13 extends between two lateral faces 14,15 of the fastening device. Finally the fastening device 7 is provided with a cylindrical aperture 16 situated in the central plane of the fastening device and ending in the cylindrical chamber 13, the axis of the aperture 16 being substantially perpendicular to the axis of the cylindrical chamber 13.

The snood 6 further comprises a snood line 17 provided with a first spherical thickening 18 at one end, an outer broadened shank tip 19 of a hook 20 being embedded in the said thickening. The other end of the snood line 17 is provided with a second spherical thickening 21 accommodated in the cylindrical chamber 13 of the fastening device, the adjacent portion of the snood line extending through the aperture 16. The second spherical thickening 21 of the snood line 17 has a diameter slightly smaller than that of the cylindrical chamber 13. As the line 17 has a smaller diameter than the aperture 16, the snood line may rotate and pivot freely in relation to the fastening device 7.

Figure 4:
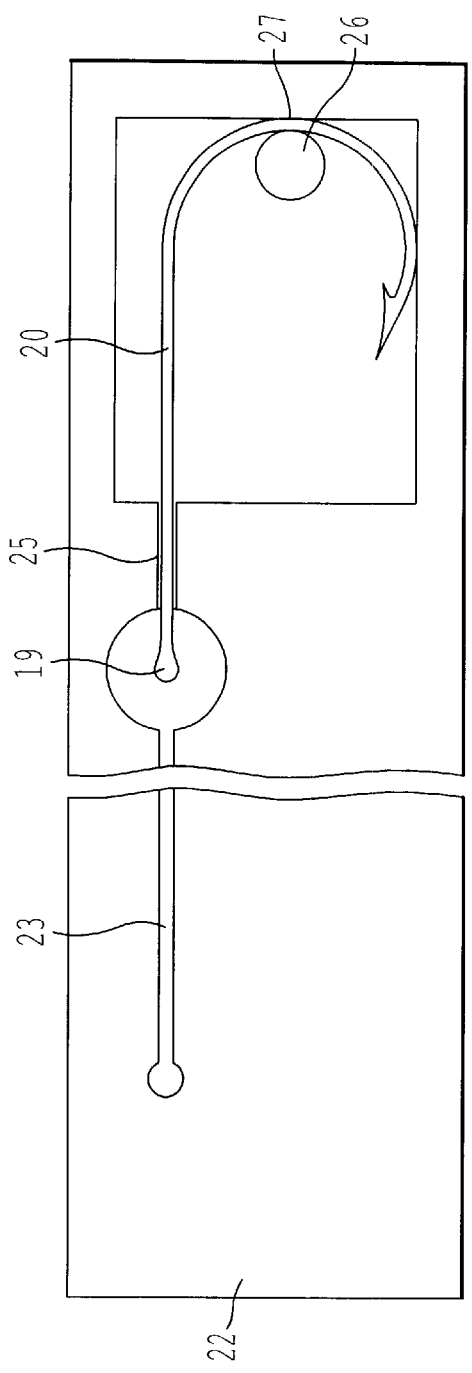
FIG. 4 is a diagrammatic view in the direction toward a parting surface of a mold half of an injection mold for manufacturing a snood line forming part of the snood according to the invention.
Figure 5:
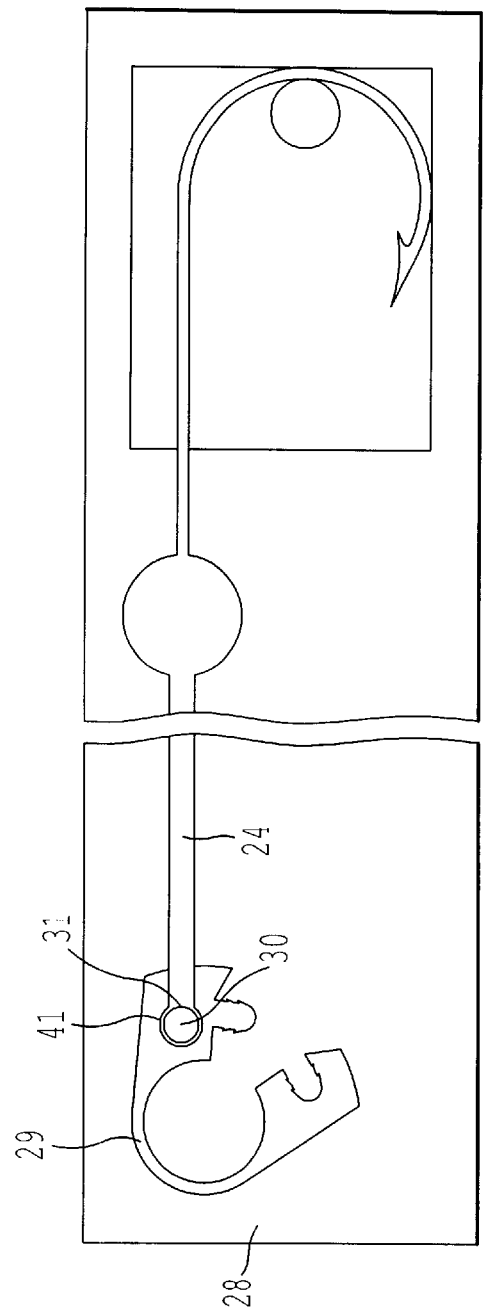
FIG. 5 is a diagrammatic view in the direction toward a parting surface of a mold half of an injection mold for manufacturing a fastening device forming part of the snood according to the invention.

With reference to FIGS. 4 and 5 a first method of manufacturing the snood shown in FIGS. 1 to 3 is now described in detail.

The snood line is molded in a first injection mold substantially formed of two symmetrical mold halves. When the snood line is molded the broadened shank tip 19 of the hook 20 is embedded in the first spherical thickening. With a view hereto the injection mold 22 is provided with a mold cavity 23 corresponding to the shape of the snood line, the snood line being molded with a diameter exceeding the diameter thereof in use. Moreover, the mold is provided with positioning faces 25–27 for correct positioning of the hook 20 in the mold such that the broadened shank tip 19 of the hook is embedded in the correct position. FIG. 4 illustrates the hook 20 arranged in the injection mold 22.

When molded the snood line is transferred to a second injection mold, of which one mold half 28 is diagrammatically shown in FIG. 5. This injection mold is formed substantially symmetrical such that the other mold half corresponds substantially to the shown mold half. The second mold 28 has a mold cavity 29 corresponding to the shape of the fastening device 7. Each of the mold halves 28 is further provided with a core 41 having a cylindrical outer shape to form the cylindrical chamber 13 of the fastening device 7. A hemispherical recess 30 is formed in each of the mutually facing end faces of the cores 41. The recesses 30 correspond jointly to the shape of the second spherical thickening 21 of the snood line 17. Jointly with a second cavity 24, which corresponds substantially to the shape of the snood line, the hemispherical recesses 30 position and retain the snood line during molding of the fastening device. It should also be noted that each of the cores 41 is provided with radially extending semi-cylindrical recesses 31 in its inner end face, said recesses tightly enclosing the adjacent portion of the snood line in the molding position of the mold. FIG. 5 illustrates the snood line with the hook arranged in the injection mold.

Since the previously molded snood line as illustrated in FIG. 5 is arranged in the mold for molding of the fastening device during the molding thereof, the fastening device is molded with the second spherical thickening 21 accommodated in the chamber 13 and the snood line extending through the aperture 16. It should be noted that the portion of the snood line adjacent the second spherical thickening 21 forms the part of the mold cavity forming the aperture. When the fastening device 7 has been molded, the snood line 17 is stretched, whereby its diameter is reduced such that the diameter of the aperture 16 exceeds the diameter of the snood line 17. This feature is illustrated in FIG. 3 in which the diameter of the snood line in its molded state is shown by means of dotted line and its diameter subsequent to stretching is shown by means of solid lines.

In the first method described above for manufacturing a snood according to the invention a plastic material having a higher melting point than the material of the fastening device is used for the snood line 17. As an example PA6 having a melting point of about 225° C. may be used for the snood and POM having a melting point of about 180° C. may be used for the fastening device. In this instance it is advantageous to stretch the snood line at a temperature of about 170° C.

Figure 6:
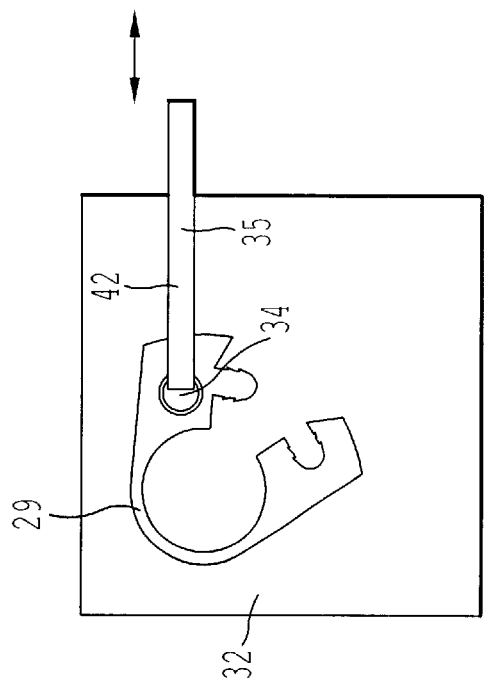
FIG. 6 is a diagrammatic view in the direction toward a parting surface of a mold half of another injection mold for manufacturing a fastening device forming part of the snood according to the invention.
Figure 7:
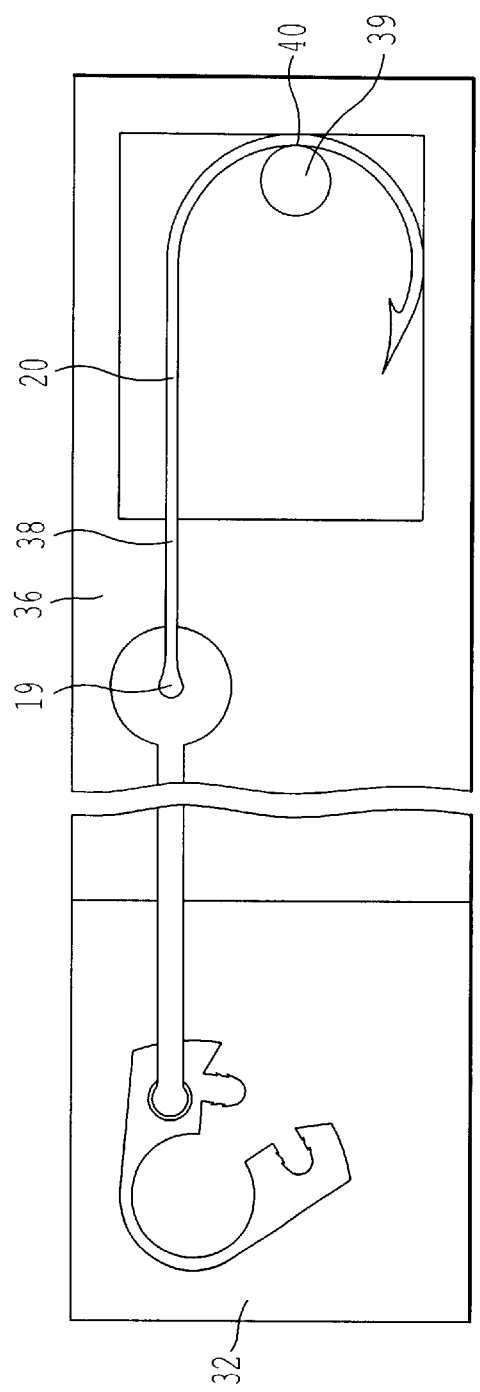
FIG. 7 is a diagrammatic view in the direction toward a parting surface of a mold half of another injection mold for manufacturing a snood line forming part of the snood according to the invention.

Referring now to FIGS. 6 and 7 another method of manufacturing the snood shown in FIGS. 1 to 3 is now described.

The fastening device 7 is molded with the shape shown in FIG. 3 in a first injection mould substantially formed of two essentially symmetrical mold halves, of which one mold half 32 is shown in FIG. 6. To this end the mold comprises two substantially symmetrical mold cavities 33. For the formation of the cylindrical chamber 13 each mold half 32 comprises a core 34 corresponding substantially to the core 41 described above and a movable core 35 provided in the parting surface for the formation of the aperture 16. The movable core 35 is guided by means of a guide bore 42 formed by semi-circular faces in the mold halves.

After molding of the fastening device, the movable core 35 is withdrawn and the mold 32 is displaced in its closed state in the direction of the arrow P to the position shown in FIG. 7 in which the guide bore 42 of the movable core 35 is aligned with a corresponding portion of a mold cavity in an additional injection mold 36. The additional injection mold comprises two substantially symmetrical mold halves, of which one mold half 36 is shown. Jointly with the mold cavity formed of the hemispherical recesses in the end faces of the cores 34, the radially extending semi-cylindrical recesses in the rims thereof and the aperture in the fastening device the mold cavity (not shown) of the additional injection mold forms a mold cavity for molding the snood. The hemispherical recesses and the semi-circular recesses correspond to the recesses 30 and 31, respectively, of the cores 41 shown in FIG. 5. The additional mold further comprises positioning faces 38, 39, 40 for correct positioning of the hook 20.

The snood line is molded in means of the injection molds 32, 36 in the position shown in FIG. 7, the snood line is molded, whereby the broadened shank tip 19 of the hook is embedded in the first spherical thickening 18 and the second spherical thickening 21 is accommodated in the cylindrical chamber 13 of the fastening device.

As described above in relation to the first method, the snood line is stretched subsequently to being molded.

In a modification of the second method, the molded fastening device may be removed from the first injection mold and placed in a corresponding cavity of a second injection mold substantially corresponding to a mold formed of the molds 32 and 36 shown in FIG. 7 whereafter molding the snood line takes place therein.

In the second method described above a plastic material with a melting point exceeding that of the material of the snood line 17 is used for the fastening device 7. The fastening device may for instance be molded of polyamide imide having a glass transition temperature of about 280° C., and the snood line may be molded of PA6 having a melting point of about 225° C. It is thus possible to stretch the snood line at a temperature of about 70° C.

What is claimed is:

1. Snood for a long line, said snood comprising:
an injection molded plastic fastening device for securing the snood between fixed stop means on the long line and being shaped substantially as an open annular or tubular member with two arms, their free ends provided with locking means adapted to lockingly snap engage each other so as to form a gripping aperture receiving the long line and to allow the fastening device to rotate freely about the long line;
a snood line provided with a first thickening at one end, a shank tip of a hook being fixedly embedded therein and the other end of the line extending through an aperture formed in the fastening device and having an axis substantially in a plane essentially perpendicular to the long line when the fastening device is mounted thereon, said aperture ending in a seat in a chamber formed in the fastening device, said chamber adapted to receive a second thickening arranged at an extremity of the second end of the snood line,
wherein the second thickening is formed integrally with the snood line by injection molding thereof in a plastic material different from and having a melting point different from the plastic material from which the fastening device is injection molded, the snood being formed in two successive molding processes of the snood line and the fastening device, respectively, the second thickening accommodated in the chamber and the snood line extending through aperture.

2. Snood according to claim 1, wherein the second thickening of the snood is rotational-symmetrical about the axis of the snood line.

3. Snood according to claim 2, wherein the second thickening of the snood line is substantially spherical at least in the seat area of the fastening device.

4. Snood according to claim 1, wherein the chamber at least in the portion adjacent the seat has a substantially cylindrical inner shape and extends between opposed lateral walls of the fastening device transversely of the aperture.

5. Method for manufacturing a snood according to claim 1, and by which method the snood line with associated first and second thickenings is molded in a corresponding mold cavity of an injection mold, the outer shank tip of the hook being molded into a first thickening at a same time and the fastening device subsequently being molded in a corresponding second mold cavity of an injection mold, the thickening portion of the snood line being received in a portion of the mold cavity corresponding to the chamber and the portion of the snood line adjacent the second thickening forming a part of the mold cavity, and whereby the material of the snood line has a melting point exceeding the melting point of the material of the fastening device.

6. A method according to claim 5, wherein the mold cavity for injection molding the fastening device comprises mold-cavity forming parts enclosing the second thickening and forming a chamber whose inner surface is spaced apart from and encloses the thickening.

7. Method of manufacturing a snood according to claim 1, by which method the fastening device and the aperture therein are molded in a corresponding mold cavity of an injection mold, the snood line subsequently being molded in a corresponding second mold cavity of an injection mold and the fastening device being arranged such that in the mold the portions of the mold cavity corresponding to the second thickening are arranged in the chamber and at least the aperture of the fastening device forms part of the mold cavity, and whereby the material of the fastening device has a melting point exceeding the melting point of the material of the snood line.

8. Method according to claim 7, wherein the mold cavity for injection molding the snood line comprises mold-cavity forming parts for formation of a second thickening accommodated in the chamber spaced apart from the inner surface thereof.

9. Method according to claim 5, wherein the snood line is made of a stretchable plastic material, said line subsequently being stretched.

\* \* \* \* \*